(12) United States Patent
Myers et al.

(10) Patent No.: US 12,124,384 B2
(45) Date of Patent: Oct. 22, 2024

(54) INTEGRATED CIRCUIT DEVICE, SYSTEM AND METHOD

(71) Applicant: Arm Limited, Cambridge (GB)

(72) Inventors: James Edward Myers, Cambridge (GB); Shidhartha Das, Cambridge (GB)

(73) Assignee: Arm Limited, Cambridge (GB)

( * ) Notice: Subject to any disclaimer, the term of this patent is extended or adjusted under 35 U.S.C. 154(b) by 92 days.

(21) Appl. No.: 17/817,686

(22) Filed: Aug. 5, 2022

(65) Prior Publication Data

US 2023/0048259 A1    Feb. 16, 2023

(30) Foreign Application Priority Data

Aug. 12, 2021    (GB) .................................... 2111593

(51) Int. Cl.
| | |
|---|---|
| G06F 21/72 | (2013.01) |
| G01R 31/28 | (2006.01) |
| G01R 31/303 | (2006.01) |
| G06F 12/14 | (2006.01) |
| G06F 21/60 | (2013.01) |
| G11C 29/12 | (2006.01) |
| H01L 21/66 | (2006.01) |

(52) U.S. Cl.
CPC .......... G06F 12/1408 (2013.01); G06F 21/72 (2013.01); *G06F 2212/1052* (2013.01)

(58) Field of Classification Search
CPC ................. G06F 12/1408; G06F 21/72; G06F 2212/1052
USPC ....................................................... 713/193
See application file for complete search history.

(56) References Cited

U.S. PATENT DOCUMENTS 5,708,715 A * 1/1998 Vicard ..................... G06F 21/73
 713/172
5,764,655 A * 6/1998 Kirihata ......... G01R 31/318505
 714/733

(Continued)

FOREIGN PATENT DOCUMENTS

WO    2021/094714 A1    5/2021

OTHER PUBLICATIONS

Yong-Qiang ; Trusted Integrated Circuits: The Problem and Challenges; SPRINGER:2014; pp. 918-928.*

(Continued)

*Primary Examiner* — Monjur Rahim
(74) *Attorney, Agent, or Firm* — NIXON & VANDERHYE P.C.

(57) ABSTRACT

An integrated circuit device including processing circuitry, communications circuitry configured to provide a communication link with a communication apparatus external to the integrated circuit device, and a memory accessible by the processing circuitry and by the communications circuitry, the memory comprising a memory region to which the processing circuitry has write access and to which the communications circuitry has read access, in which the processing circuitry is configured to write information to the memory region indicative of one or more use conditions of the integrated circuit device, and in which the communications circuitry is configured to access the memory region and to provide the information indicative of the one or more use conditions of the integrated circuit device via the communication link.

17 Claims, 4 Drawing Sheets

(56) References Cited

U.S. PATENT DOCUMENTS

| | | | | |
|---|---|---|---|---|
| 6,134,662 | A * | 10/2000 | Levy | G06F 21/606 |
| | | | | 713/160 |
| 6,212,633 | B1 * | 4/2001 | Levy | H04L 63/0218 |
| | | | | 713/153 |
| 10,958,652 | B1 * | 3/2021 | Butzer | G06Q 20/3821 |
| 2004/0083487 | A1 * | 4/2004 | Collens | H04N 21/43615 |
| | | | | 380/255 |
| 2010/0271064 | A1 * | 10/2010 | Kohler | G01R 31/31935 |
| | | | | 324/750.05 |
| 2015/0099560 | A1 * | 4/2015 | Schell | H04L 63/18 |
| | | | | 455/552.1 |
| 2016/0010574 | A1 * | 1/2016 | Kumar | B61L 15/0058 |
| | | | | 701/104 |
| 2016/0320445 | A1 * | 11/2016 | Lin | G01R 31/3187 |
| 2017/0026840 | A1 * | 1/2017 | Eyal | H04L 63/1433 |
| 2018/0192273 | A1 * | 7/2018 | Meziache | H04B 5/72 |
| 2020/0067900 | A1 * | 2/2020 | Caldwell | H04L 47/82 |
| 2020/0387422 | A1 | 12/2020 | Bell et al. | |
| 2021/0011787 | A1 * | 1/2021 | Guim Bernat | G06F 9/542 |
| 2021/0076204 | A1 * | 3/2021 | Goyal | H04L 67/306 |
| 2021/0303180 | A1 * | 9/2021 | Chang | H04W 12/02 |

OTHER PUBLICATIONS

Office Action for GB Application No. 2111593.6 dated Sep. 15, 2023, 5 pages.

Examination Report for GB Application No. 2111593.6 dated Nov. 29, 2023, 4 pages.

Examination Report for GB Application No. 2111593.6 dated Apr. 22, 2024, 5 pages.

Examination Report for GB Application No. 2111593.6 dated Jul. 30, 2024, 4 pages.

* cited by examiner

Fig. 10

INTEGRATED CIRCUIT DEVICE, SYSTEM AND METHOD

CROSS-REFERENCE TO RELATED APPLICATIONS

This application claims priority pursuant to 35 U.S.C. 119(a) to United Kingdom Application No. 2111593.6, filed Aug. 12, 2021, which application is incorporated herein by reference in its entirety.

BACKGROUND

This disclosure relates to integrated circuit devices, systems and methods.

Electronic waste or "e-waste" (that is, waste relating to used electronic devices) is a potential sustainability and ecological issue. It has been asserted that on average each person in the UK generates several kilograms of such waste per year, for example being made up of plastic enclosures (which can take centuries to break down), printed circuit boards (PCBs) (which cannot generally be recycled and may contain toxins) and integrated circuit devices (ICs). Integrated circuits can represent a manufacturing investment in terms of the rare earths and the processing steps which may have been used to manufacture them.

There have been proposals towards "circular" or reusable/recyclable materials for the former two (such as bioplastics that can be composted), but as regards silicon ICs there are no such current proposals.

It is in the context of these issues that the present disclosure arises.

SUMMARY

In an example arrangement there is provided an integrated circuit device comprising: processing circuitry; communications circuitry configured to provide a communication link with a communication apparatus external to the integrated circuit device; and a memory accessible by the processing circuitry and by the communications circuitry, the memory comprising a memory region to which the processing circuitry has write access and to which the communications circuitry has read access; in which the processing circuitry is configured to write information to the memory region indicative of one or more use conditions of the integrated circuit; and in which the communications circuitry is configured to access the memory region and to provide the information indicative of the one or more use conditions of the integrated circuit via the communication link.

In another example arrangement there is provided a system comprising: the integrated circuit device defined above; and communication apparatus external to the integrated circuit device, the communication device being configured to communicate with the communications circuitry of the integrated circuit device via the communication link and to receive from the integrated circuit device information comprising at least the information indicative of the one or more use conditions of the integrated circuit.

In another example arrangement there is provided a method of operation of an integrated circuit device, the method comprising: writing information to a memory region indicative of one or more use conditions of the integrated circuit; providing read access to the memory region to communications circuitry of the integrated circuit device; establishing a communication link with a communication apparatus external to the integrated circuit device; and the communications circuitry accessing the memory region and providing the information indicative of the one or more use conditions of the integrated circuit via the communication link.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Overview Of Operations

Examples of the disclosure can enable an external (for example a wireless) survey of integrated circuit devices in "end of life" PCBs, potentially automating or at least facilitating the detection of specific ICs, and what condition they are in (or are probably in), such that they can be desoldered and reused if needed and/or valuable. Power can be delivered wirelessly as well as command/data, such that PCB power is not necessarily required.

The present techniques can embed a wireless data (and optionally power) interface into each integrated circuit device, such that a PCB may be easily probed to identify what ICs are present and, based on data indicative of their use, what condition they are likely to be in. ICs of interest and/or value that are in suitable condition could then be desoldered or disconnected and resold or reused. The techniques can avoid a complex alternative process of identifying the PCB (either manually or with advanced computer vision), then looking up service manuals from the product vendor (which are not generally machine readable and may not even be public), then manually evaluating the health of an IC of interest using developer documentation (which again may not be machine readable and may even require a non-disclosure agreement (NDA) to obtain). So the techniques can potentially reduce the risk and cost of recycling ICs.

Wireless power and data transfer techniques are known, for example for radio frequency identification (RFID) devices. Similar technology can be used to provide the communication link discussed here.

In term of an energy harvesting arrangement, a high power "reader" or external communication apparatus can radiate energy which is collected and selectively reflected from an otherwise unpowered or passive "tag" or in this case otherwise unpowered communications circuitry 140. The present techniques may therefore use a similar scheme at similar frequency band (UHF 900 MHz+), where the main requirement is for low (for example, <10 cm) operating range and miniaturised antenna formations such that the antenna can be included in one or more layers, such as backend metal layers, of an IC (whether digital, analogue or mixed-signal).

Example Integrated Circuit Device

Figure 1:
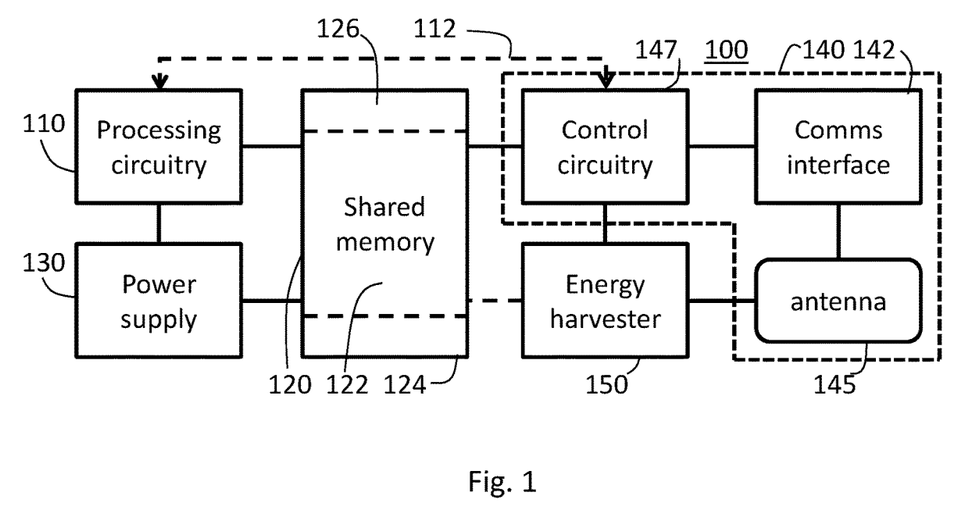
FIG. 1 schematically illustrates an integrated circuit device.

Referring now to the drawings, FIG. 1 schematically illustrates an integrated circuit device 100 comprising processing circuitry 110, communications circuitry 140 configured to provide a communication link with a communication apparatus external to the integrated circuit device (not shown in FIG. 1 but illustrated as apparatus 410 in FIG. 4 below), and a memory (also referred to as a shared memory) 120 accessible by the processing circuitry and by the communications circuitry, the memory comprising a memory region 122 to which the processing circuitry has write access (for example, read and write access) and to which the communications circuitry has read access (for example, read only access).

In operation, and as described below, the processing circuitry 110 is configured to write information to the memory region 122 indicative of one or more use conditions of the integrated circuit device. The communications circuitry 140 is configured to access the memory region 122 and to provide the information indicative of the one or more use conditions of the integrated circuit device via the communication link.

The memory 120 may also provide a further memory region 124 which can be written to by the communications circuitry 140 (and which is discussed below) and/or a further memory region 126 which is read-only to the processing circuitry 110 and to the communications circuitry 140 (and which again is discussed below).

The communication link could provide a wired communication link, for example making use of externally accessible terminals or the like, for example as one or more spare pins or on an exposed or top (when mounted for use) surface of the integrated circuit device, but in the examples to be described the communication link is a wireless communication link. To this end, an antenna 145 may be provided as part of the communications circuitry 140, for example of a type described in WO 2021/094714 A1, the contents of which are hereby incorporated into the present description by reference. The antenna can optionally provide communication functionality and also so-called energy harvesting functionality to be described below, using energy harvesting circuitry 150.

A power supply 130 can provide operating power to at least the processing circuitry in a normal use mode of the integrated circuit device 100.

The communications circuitry 140 may comprise control circuitry 147 which can cooperate with a communications interface 142 to provide the functions specified for the communications circuitry, for example by providing an interface to the memory 120 and/or by overseeing secure or encrypted access to be discussed below.

A data link or connection 112 may be provided between the processing circuitry 110 and the control circuitry 147. The optional use of this will be discussed below.

Note that the processing circuitry may be digital processing circuitry. In other examples, it could be represented by, for example, a state machine in an analogue circuit.

Populating Data in the Shared Memory

As discussed above, the present technology also provides for information indicative of the one or more use conditions of the integrated circuit device to be written to the memory 120 (or at least to the memory region 122) and then to be read out, for example on a read-only basis, by the communications circuitry 140 and provided to an external apparatus.

Figure 2:
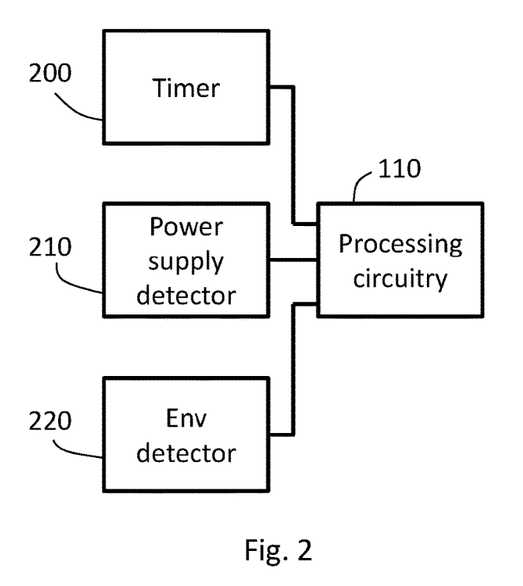
FIG. 2 schematically illustrates circuitry for use in populating a shared memory.
Figure 3:
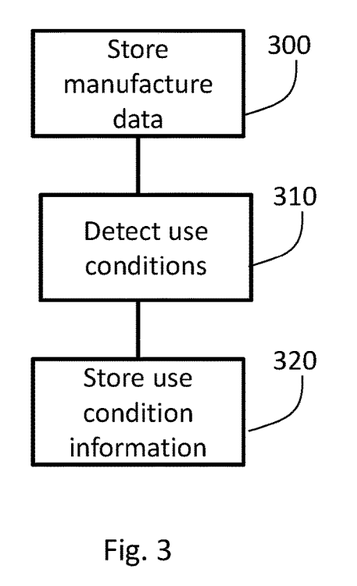
FIG. 3 is a schematic flowchart illustrating a method.

As shown schematically in FIG. 2, the processing circuitry 110 may be associated with further circuitry by which the processing circuitry may derive information to be written to the memory 120, examples of such circuitry including timer circuitry 200, power supply detector circuitry 210 and/or environment detector circuitry 220.

In example embodiments therefore, the processing circuitry is configured to write to the memory region, as at least part of the information indicative of the one or more use conditions of the integrated circuit device, one or more selected from the list consisting of: data indicative of a time period of powered operation of the integrated circuit device, for example an hour or minute counter value which is read from the memory region 122 as part of a boot or start-up process of the processing circuitry, incremented by the timer circuitry 200 during operation of the integrated circuit device and then written back to the memory region 122 at shut-down of the processing circuitry. Alternatively, the timer circuitry can interact directly with the value stored by the memory region 122 and update it during powered operation of the integrated circuit device, at least at intervals such as one minute, so that at any instant during operation of the integrated circuit device, the stored counter value represents an up-to-date (or at least almost up-to-date) value indicative of a time period of use (such as powered use) of the integrated circuit device; data indicative of one or more power supply parameters during powered operation of the integrated circuit device. Here the power supply detector 210 can be configured to detect such parameters and (in cooperation with the processing circuitry 110) to write data indicative of the detected parameters to the memory region 122. Examples of stored data indicative of such parameters detected in this way may include for example one or more of: (i) a prevailing count of instances of over-voltage, which is to say instances in which the voltage provided by the power supply 130 exceeded a target voltage by at least a threshold deviation such as a threshold of 0.1 volts; (ii) a prevailing time period indicative of cumulative time during which the power consumption of the integrated circuit device was greater than a target power consumption by at least a threshold deviation such as a threshold of 0.05 watts (or, when expressed in terms of current consumption, a threshold of, say, 0.05 amperes). Data indicative of environmental conditions during powered operation of the integrated circuit device.

For example the environmental detector 220 may include a temperature detector and/or a humidity detector and/or a vibration or acceleration detector configured to detect instances in which the integrated circuit device is subjected to mechanical shocks, with the respective data stored in the memory region 122 including respectively: (i) a record of operating temperature against time during powered operation or a record of instances of the operating or ambient temperature exceeding a threshold temperature such as 50° C.; (ii) a record of ambient humidity during powered operation against time or a record of instances of the ambient humidity exceeding a threshold humidity such as 90% humidity; (iii) a record of instances of the integrated circuit device being subjected to an acceleration exceeding a threshold acceleration such as 0.1 G.

Any one or more of these data items may be stored, or indeed other data items may be provided which represent information indicative of the one or more use conditions of the integrated circuit device.

Not all of the information held by the memory 120 has to be populated by the processing circuitry during use of the integrated circuit device, however. For example, the memory 120 may be configured to store, for read access by the communications circuitry, manufacturer data indicative of one or more selected from the list consisting of: data indicative of a manufacture date of the integrated circuit device, for example a date code according to a code scheme established by the manufacturer; data indicative of a manufacturer part number of the integrated circuit device; and data indicative of one or more operational capabilities of the integrated circuit device, such as data indicative of a specification of the processing device (bus width, clock speed, instruction set or the like), data indicative of memory storage or communication capabilities or bus standards of the integrated circuit device in normal powered operation, data indicative of a maximum rated temperature, humidity and/or physical shock or the like.

These data can be stored to the memory at manufacture of the integrated circuit, for example being written to a programmable read-only memory region 126 which is accessible on a read-only basis by the communications circuitry 140 and which (for example) cannot be written to by either the communications circuitry or the processing circuitry.

System Aspects and Retrieving Data from the Shared Memory

Figure 4:
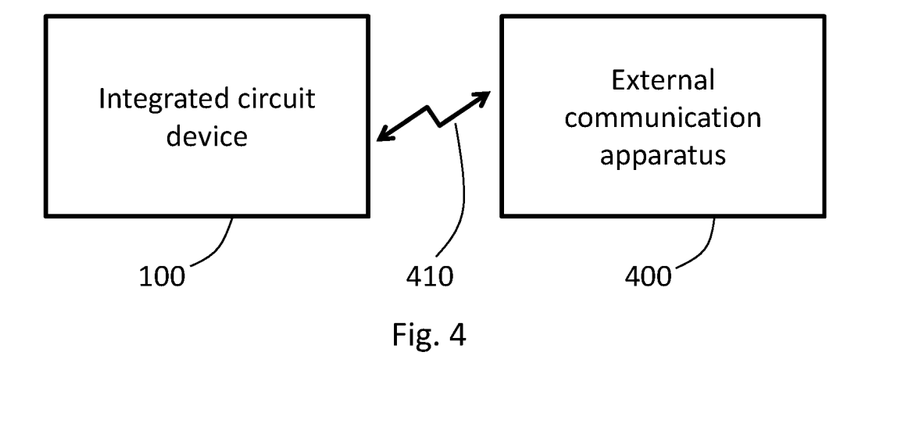
FIG. 4 schematically illustrates a system.

As shown schematically in FIG. 4, the arrangement may be embodied as a system comprising the integrated circuit device 100 of FIG. 1; and communication apparatus 400 external to the integrated circuit device, the communication device being configured to communicate with the communications circuitry of the integrated circuit device via the communication link (such as a wireless communication link shown schematically as a link 410) and to receive from the integrated circuit device information comprising at least the information indicative of the one or more use conditions of the integrated circuit device.

Here, at a data-reading occasion or instance, the external communication apparatus 400 is brought into communication with the communications circuitry 140 of the integrated circuit device 100 and the arrangement then provides for the reading of data from at least the memory region 122 for provision to the external communication apparatus 400. The processing or handling of the data by the external communication apparatus 400 is a matter of design choice and does not necessarily represent a feature of the present embodiments. For example, the external communication apparatus 400 may compare the information indicative of one or more use conditions of the integrated circuit device with a set of desired parameters representing an integrated circuit device which is considered worthwhile to be recovered so as to provide an indication of whether or not the integrated circuit device should be decoupled from a printed circuit board or other arrangement by which it is currently in use in order that it may be further reused. Similarly, the external communication apparatus 400 may compare the manufacturer data with a required device specification in order to select an integrated circuit device for reuse in a particular application.

Figure 5:
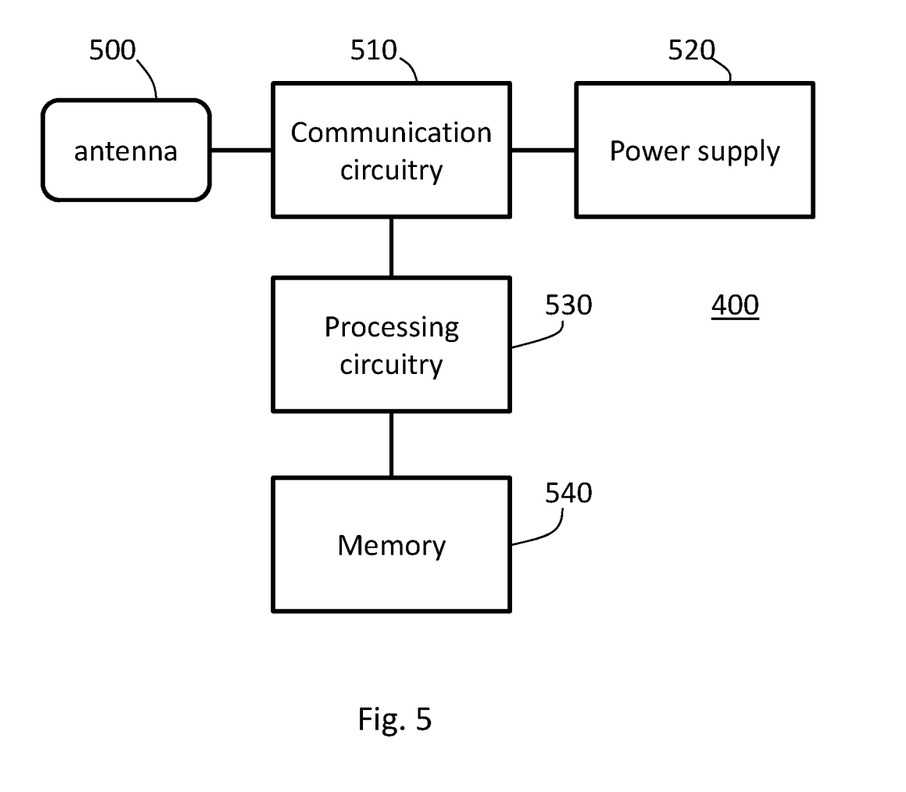
FIG. 5 schematically illustrates a communications apparatus.

As shown schematically in FIG. 5, in an example arrangement the external communication apparatus 400 may comprise an antenna 500 to provide communication with the antenna 145 of the integrated circuit device 100, communications circuitry 510 to handle data communication with the integrated circuit device 100, a power supply 520 which not only provides power to the external communication apparatus 400 but which may also provide power to the communications circuitry 140 of the integrated circuit device using so-called "energy harvesting" techniques to be discussed below, processing circuitry 530 to process data retrieved by the communications circuitry 510 and a memory 540 to store the data processed by the processing circuitry 530 and/or software by which the processing circuitry 530 operates.

Energy Provision and Harvesting

In some example arrangements, the power supply 130 can provide power to the communications circuitry 140 and to the memory 120 when in use by the communications circuitry 140. Indeed, such an arrangement is potentially relevant to certain security precautions discussed below.

In other examples, so-called energy harvesting may be used in that the integrated circuit device may comprise energy harvesting circuitry 150 to provide electrical energy for operation of at least the communications circuitry and optionally (as shown by a broken line between the energy harvesting circuitry 150 and the memory 120) the memory 120 for at least read operations.

Although shown separately to the antenna 145, the energy harvesting circuitry 150 may make use of the antenna 145 as an example of one or more coil formations, the one or more coil formations providing at least a part of the energy harvesting circuitry and at least a part of the communications circuitry. In such an arrangement, not only is data communication performed between the antenna 500 of the external communication apparatus 400 and the antenna 145 of the communications circuitry 140, but operating power (provided by the power supply 520) is also provided to the communications circuitry 140 by means of electromagnetic induction as between the two antenna formations.

In an example in which a communication link other than a wireless communication link is used, energy harvesting can be provided by power transfer using a wired connection between the external communication apparatus and the communications circuitry 140.

Secure and/or Encrypted Data Storage

In some examples, no security precautions are applied to the data held by the memory regions 122, 126 so that they can be read by any external communication apparatus 400 capable of establishing a communication link with the communications circuitry 140. In other examples, security precautions can be used such as those described below.

In some examples, the processing circuitry is configured to encrypt at least a part of the information which the processing circuitry stores to the memory region 122, and/or the memory is configured to store at least a part of the manufacturer data (for example in the memory region 126) as encrypted data. In this case, the external communication apparatus 400 may comprise decryption circuitry (for example, implemented by the processing circuitry 530 using secret information provided or curated by the integrated circuit device manufacturer) to decrypt at least a part of the information received from the integrated circuit device.

In other examples, the communications circuitry 140 may be configured to obtain secure information via the communication link for access to encrypted information held by the memory 120. In this case, the communications circuitry may be configured to implement the communication link as a secure communication link and to require secure information from the communication apparatus external to the integrated circuit device to authorise providing the information indicative of the one or more use conditions of the integrated circuit device and/or the manufacturer data via the communication link. Similarly, the communication apparatus 400 may be configured to provide secure information from the communication apparatus to authorise the communications circuitry to provide the information indicative of the one or more use conditions of the integrated circuit device and/or the manufacturer data via the communication link.

For example, the communication of secure information between the integrated circuit device and the external communication apparatus may be performed using a known secure data exchange algorithm such as the so-called Diffie-Helman algorithm.

Encryption may be performed by the processing circuitry 110 and decryption and/or authorisation may be performed by the control circuitry 147.

Figure 6:
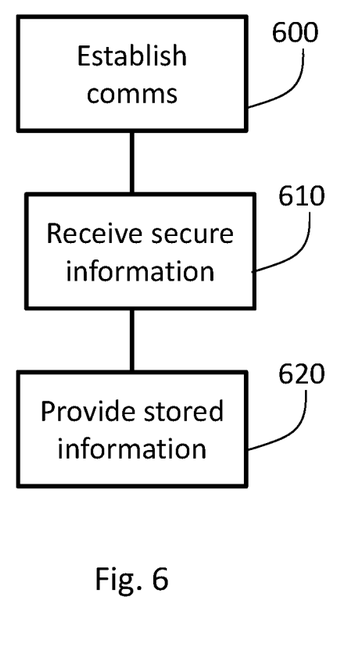
FIGS. 6 to 10 are schematic flowcharts illustrating respective methods.

Referring to the flowchart of FIG. 6, at a step 600, communication is established between the communications circuitry 140 and the external communication apparatus 400. At a step 610 the communications circuitry 140 receives secure information from the external communication apparatus and at a step 620, in response to authorisation indicated by the received secure information, the communications circuitry 140 provides the stored information from the memory 120.

Figure 7:
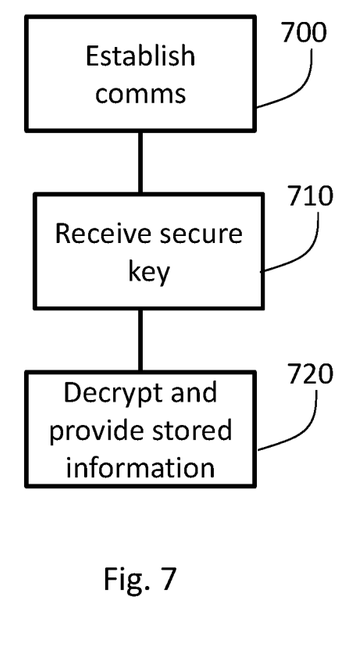

Referring to the flowchart of FIG. 7, at a step 700, communication is established between the communications circuitry 140 and the external communication apparatus 400. At a step 710 the communications circuitry 140 receives a secure key from the external communication apparatus and at a step 720, in response the communications circuitry 140 decrypts and provides the stored information from the memory 120.

Further Optional Security Measures

As mentioned above under the discussion of energy harvesting, the communications circuitry 140 may be configured to receive operating power from the power supply 130. Whether or not this is the case (that is to say, whether or not energy harvesting as discussed above is used), as a further security measure the communications circuitry 140 may be configured not to read information from the memory when the processing circuitry is currently in powered operation. This could in principle help to deter security attacks against, for example, a mobile device carried by a user in that while the mobile devices being carried it is like to be in powered operation which, using this technique, inhibits an external communication apparatus (for example carried by an attacker brushing past the user carrying the mobile device) from establishing parameters of integrated circuit device is used in the mobile device.

Figure 8:
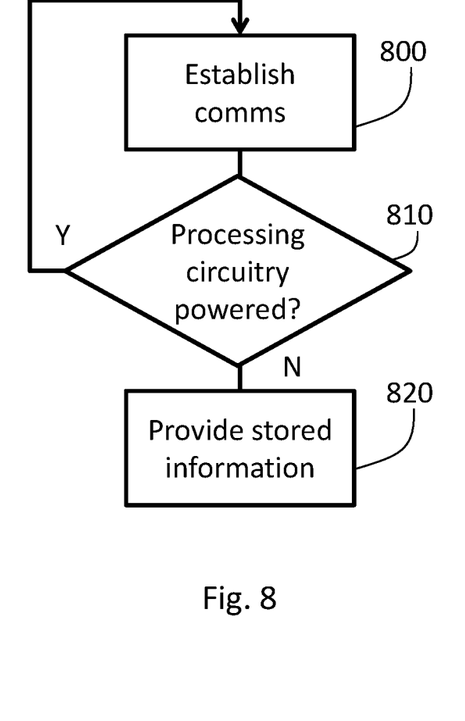

Referring to FIG. 8, at a step 800 communication is established between the communications circuitry 140 and the external communication apparatus 400. At a step 810, a detection is made by the control circuitry 147 as to whether the processing circuitry 110 is currently powered, for example by interrogating the processing circuitry 110 by the data Link 112 and/or by sensing a supply voltage. If not, then the stored information is provided at a step 820. If, however, the processing circuitry 110 is currently powered then control returns to the step 800.

In other examples, the memory 120 comprises at least a further memory region 124 to which the communications circuitry has write access. In this case, the communications circuitry may be configured to write information to the further memory region indicative of a number of read accesses to the memory made by the communications circuitry for which the communications circuitry provided information read from the memory via the communication link. Here, a relatively large number of read accesses may be indicative of a potential security breach or attack. The information stored by the further memory region 124 could be readable by the processing circuitry 110 (and compared with a threshold number of read accesses in order to generate a security warning to the remainder of the system containing the integrated circuit device and/or to its user) and/or by the external communication apparatus itself 400 so that a similar security warning can be provided to or by the external communication apparatus 400 and/or its user.

Figure 9:
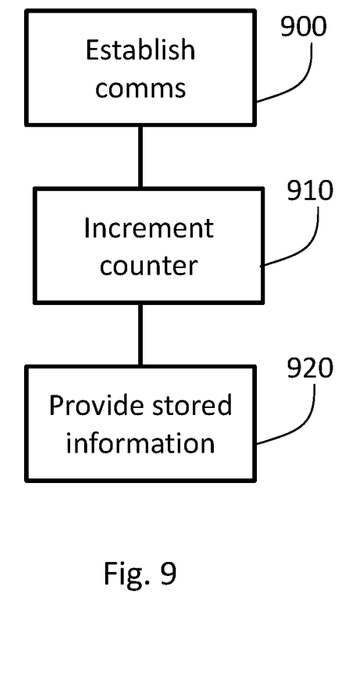

Referring to the flowchart of FIG. 9, at a step 900 a communication link is established between the communications circuitry 140 and the external communication apparatus 400. At a step 910, a counter, for example maintained in the memory region 124 capable of being written to by the control circuitry 147, is incremented by the control circuitry 147. At a step 920, the stored information is provided to the external communication apparatus 400.

3DIC Example

At least some examples of the present technology may be implemented using so-called three-dimensional integrated circuit (3DIC) technology. It is noted, however, that the use of 3DIC technology relates only to examples and is not a requirement for the implementation of the present technology.

3DIC technology is described by en.wikipedia.org/wiki/Three-dimensional_integrated_circuit, the contents of which are hereby incorporated into the present description by reference.

An example 3DIC arrangement comprises a set or stack of semiconductor substrates which overlie one another in a direction (such as a z direction, vertically as drawn) which may be perpendicular to the (x, y) plane of each substrate. The substrates may be, for example, formed of silicon wafers or dies having metal-oxide semiconductor (MOS) circuit elements formed on the substrates. Electrical connections between the respective substrates can be provided by, for example, so-called through-silicon vias (TSVs). In some examples, each of the substrates may carry portions of the different nodes shown in FIG. 1, or in other examples a given substrate may be dedicated to (for example) memory circuitry and associated interface circuitry with another substrate being dedicated to (for example) processing circuitry or the like.

In connection with the present examples, a 3DIC structure may provide (say) a so-called chiplet (for example one of the substrates mentioned above) on top of an advanced node SOC, that implements the memory and communications discussed above, noting that at least wireless communications may be more efficient if implemented on an outer substrate of a 3DIC structure. In such a case, the 3DIC structure is considered to represent an example of an integrated circuit device according to the present technology.

Method Example

Figure 10:
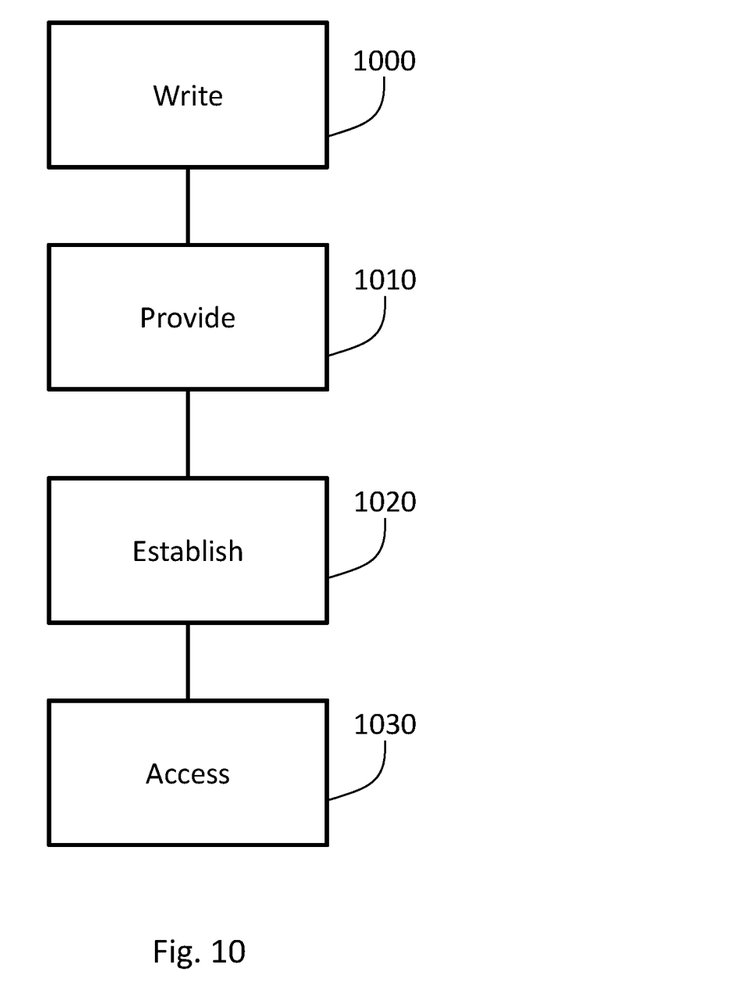

FIG. 10 is a schematic flowchart illustrating a method of operation of an integrated circuit device such as the device 100, the method comprising: writing (at a step 1000) information to a memory region indicative of one or more use conditions of the integrated circuit device; providing (at a step 1010) read access to the memory region to communications circuitry of the integrated circuit device; establishing (at a step 1020) a communication link with a communication apparatus external to the integrated circuit device; and the communications circuitry accessing (at a step 1030) the memory region and providing the information indicative of the one or more use conditions of the integrated circuit device via the communication link.

General Matters

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An integrated circuit device comprising:
   processing circuitry;
   communications circuitry configured to provide a communication link with a communication apparatus external to the integrated circuit device; and
   a memory accessible by the processing circuitry and by the communications circuitry, the memory comprising a memory region to which the processing circuitry has write access and to which the communications circuitry has read access;
   in which the processing circuitry is configured to write information to the memory region indicative of one or more conditions in which the integrated circuit device has been used;
   and in which the communications circuitry is configured to access the memory region and to provide the information indicative of the one or more conditions in which the integrated circuit device has been used via the communication link;
   in which the processing circuitry is configured to write to the memory region, as at least part of the information indicative of the one or more conditions in which the integrated circuit device has been used, one or more selected from the list comprising:
   data indicative of a time period of powered operation of the integrated circuit device;
   data indicative of one or more power supply parameters during powered operation of the integrated circuit device; and
   data indicative of environmental conditions during powered operation of the integrated circuit device.

2. The integrated circuit device of claim 1, in which the communications circuitry has read-only access to the memory region.

3. The integrated circuit device of claim 1, in which the memory is configured to store, for read access by the communications circuitry, manufacturer data indicative of one or more selected from the list comprising:
   data indicative of a manufacture date of the integrated circuit device;
   data indicative of a manufacturer part number of the integrated circuit device; and
   data indicative of one or more operational capabilities of the integrated circuit device.

4. The integrated circuit device of claim 1, in which the processing circuitry is configured to encrypt at least a part of the information which the processing circuitry stores to the memory region.

5. The integrated circuit device of claim 3, in which the memory is configured to store at least a part of the manufacturer data as encrypted data.

6. The integrated circuitry device of claim 4, in which the communications circuitry is configured to obtain secure information via the communication link for access to encrypted information held by the memory.

7. The integrated circuit device of claim 1, in which the communications circuitry is configured to implement the communication link as a secure communication link and to require secure information from the communication apparatus external to the integrated circuit device to authorise providing the information indicative of the one or more conditions in which the integrated circuit device has been used and/or manufacturer data via the communication link.

8. The integrated circuit device of claim 1, in which the communications circuitry is configured not to read information from the memory when the processing circuitry is currently in powered operation.

9. The integrated circuit device of claim 1, in which the memory comprises at least a further memory region to which the communications circuitry has write access.

10. The integrated circuit device of claim 9, in which the communications circuitry is configured to write information to the further memory region indicative of a number of read accesses to the memory made by the communications circuitry for which the communications circuitry provided information read from the memory via the communication link.

11. The integrated circuit device of claim 1, comprising energy harvesting circuitry to provide electrical energy for operation of at least the communications circuitry.

12. The integrated circuit device of claim 11, comprising one or more coil formations, the one or more coil formations providing at least a part of the energy harvesting circuitry and at least a part of the communications circuitry.

13. The integrated circuit device of claim 1, in which the communication link is a wireless communication link.

14. A system comprising:
    the integrated circuit device of claim 1; and
    communication apparatus external to the integrated circuit device, the communication device being configured to communicate with the communications circuitry of the integrated circuit device via the communication link and to receive from the integrated circuit device information comprising at least the information indicative of the one or more conditions in which the integrated circuit device has been used.

15. The system of claim 14, in which the communication apparatus comprises decryption circuitry to decrypt at least a part of the information received from the integrated circuit device.

16. The system of claim 14, in which the communication apparatus is configured to provide secure information from the communication apparatus to authorise the communications circuitry to provide the information indicative of the one or more conditions in which the integrated circuit device has been used and/or manufacturer data via the communication link.

17. A method of operation of an integrated circuit device, the method comprising:
    writing information to a memory region indicative of one or more conditions in which the integrated circuit device has been used;
    providing read access to the memory region to communications circuitry of the integrated circuit device;
    establishing a communication link with a communication apparatus external to the integrated circuit device; and
    the communications circuitry accessing the memory region and providing the information indicative of the one or more conditions in which the integrated circuit device has been used via the communication link;

in which at least part of the information indicative of the one or more conditions in which the integrated circuit device has been used includes one or more selected from the list comprising:

data indicative of a time period of powered operation of the integrated circuit device;

data indicative of one or more power supply parameters during powered operation of the integrated circuit device; and data indicative of environmental conditions during powered operation of the integrated circuit device.

* * * * *